Patented Dec. 22, 1953

2,663,643

UNITED STATES PATENT OFFICE 2,663,643

MILK POWDER AND ITS PREPARATION

Francis Frederick Hansen, Pittsburgh, Pa.

No Drawing. Application December 19, 1950, Serial No. 201,703

4 Claims. (Cl. 99—56)

This invention relates to milk powder and its preparation, and is for a milk powder which is much improved for use in baking, particularly to improve the volume and oven-spring of baking dough.

It is well known that the baking industry employs enormous quantities of milk in various forms, such as skimmed milk and whole milk, either in liquid or in powdered form. Customarily, because of their keeping qualities, lack of bulk, and ease of handling, milk powders are usually employed.

Considerable trouble is experienced from time to time in the use of such milk powders, such difficulties appearing to be due to the presence of certain reducing substances in the milk. These reducing substances are sulphur-bearing materials that may be grouped under the designation of sulphydrils, which include glutathione and cysteine, and are not to be confused with casein in which the sulphur is in an inactive combination. The presence of such sulphur-bearing substances materially affects the volume and texture of the finished baked goods; they affect the protein structure and the volume and oven-spring of the dough. It is a universal custom to employ more yeast, yeast food, time and temperature in sponges or straight doughs when these milk powders are used.

The presence of such sulphur-bearing materials in the milk powders requires the employment of oxidizing agents in order to overcome the foregoing disadvantages. Thus, it is customary to use potassium bromate as an oxidizing agent, and researches have proven that more potassium bromate or other oxidizing chemicals are required to produce a good bread when milk powders are used in the formula for preparing the dough. The reason for this is that these oxidizing chemicals are necessary to oxidize the said reducing substances in milk so that they will not interfere with the normal fermentation of the yeast and the desired volume or oven-spring of the dough.

In accordance with the present invention, it is found that greatly improved baked products such as bread, rolls, cakes, and the like, when such products contain skim milk powders in their formulas, are obtained by chlorinating the milk powders to destroy the sulphydrils and utilizing the resulting chlorinated products instead of straight milk powders in the baking formulas.

In carrying out the present invention, skimmed milk is powdered in any suitable way well known to the art. The resulting powdered product is subjected to an atmosphere containing chlorine gas or chlorinating compounds of chlorine, either by agitating the milk powder in a closed container in an atmosphere of chlorine gas, or while the milk powder is suspended in an air agitation method. The chlorine is controlled so that from substantially two to substantially six ounces of chlorine are present per hundred pounds of milk powder. It is found in practice that such amounts of chlorine gas are adequate to oxidize the reducing constituents that are present in the milk powder being treated, the amount of chlorine used preferably being regulated according to the content of these reducing substances in the milk.

It is essential that the oxidation of the sulphydril compounds in the powdered skim milk should be carried out while the milk is in a dry powdered form. Whole milk generally contains an average of 85% to 89% of water while skim milk contains an average of 90% to 91% of water. If liquid whole milk or skim milk is treated with a comparatively large amount of chlorine such as used in the present process, the chlorine will react with the water in the milk to form such a large quantity of diluted hypochlorous and hydrochloric acids that the milk containing the acids will be so highly acid that the product is not suitable for human consumption, and will not keep well because they readily become rancid. Further, in such highly diluted acid solutions the sulphydrils in the solution are not effectively oxidized to change the —S—H radicals of the sulphydril structure.

It is important also that the dry skim milk powder shall contain less than three per cent of fat and preferably less than one per cent of fat. If a product containing 3% or more of fat is chlorinated, the chlorine will preferably react with the fat to form a rancid milk powder. If the chlorine is used in reacting with the fat, then the available chlorine is not effective for oxidizing the reducing reactive sulphydril compounds in the milk powder.

The oxidizing action of chlorine results in a product which, when used in the above-indicated manner, imparts to the finished baked goods a richer bloom and a much whiter texture than where normal milk powder is used. Also, the chlorinated milk powders of the present invention show superior keeping qualities in storage, because of the inhibition of rancidifying properties in normal milk powders because of the action of the chlorine on the reducing materials normally present in the milk.

It is found that the action of the chlorine gas may be carried out either at substantially atmospheric temperatures, or at elevated temperatures short of such as will cause any appreciable modification of the constituents of the milk. Somewhat longer time is required for the oxidizing action of the chlorine if the process is carried out at room temperatures, but under such conditions there is no danger of any alteration of the constituents of skim milk powder containing less than 1% of fat except as is caused by the action of the chlorine gas. As has been indicated above, the skim milk powder being treated is subjected to the chlorine gas until the desired chlorination has been effected, this being when from two to six ounces of chlorine have been employed in the atmosphere for each one hundred pounds of the milk powder.

It has been found that an exposure of the powdered dry milk for a period of three to seven minutes with two to six ounces of chlorine per one hundred pounds of dry milk will give effective results for oxidizing the different quantities of sulphydril compounds commonly found in milk. A minimum of two ounces of chlorine is required for effectively oxidizing a small amount of sulphydril compounds in a dry powdered milk containing about 3½% moisture. Dry milk containing from 3½% to 6% moisture will require more than two ounces of chlorine per one hundred pounds of dry milk. Six ounces of chlorine per one hundred pounds of dry milk is the maximum amount of chlorine that may be safely used in oxidizing the maximum amount of sulphydril compounds that normally will be found in dry milk. With more than six ounces of chlorine per one hundred pounds of dry milk, the hypochlorous and hydrochloric acids formed react with protein and albumin compounds in the milk to damage it.

This treatment with chlorine gas must be controlled so as not to over-oxidize the milk powder. It is found in practice that in an atmosphere containing about four ounces of chlorine per one hundred pounds of dry milk, a treatment of the milk powders with the chlorine-containing atmosphere for five minutes at a temperature of from substantially 80° F. to 85° F. is just enough to destroy the reducing compounds present in the milk powder, commercial powdered milks containing about 3.5% of moisture. Apparently, the action of the nascent oxygen which is generated when the milk is exposed to chlorine, is to change the sulphydril compounds in the milk powder from a structure containing —S—H radicals which are reducing in their properties to a structure wherein sulphur atoms are linked to one another in a neutral structure such as represented by the structure —S—S.

The action of the chlorine is to oxidize reducing constituents normally present in the milk, the chlorine combining with the moisture content of commercial milk powders to form hydrochloric acid and nascent oxygen:

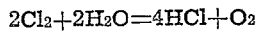

$$2Cl_2 + 2H_2O = 4HCl + O_2$$

The small amount of hydrochloric acid produced in the chlorination of dry milk stays in the milk, and is not detrimental to the yeast fermentation of baking dough. A part and probably most of the hydrochloric acid forms addition products with the basic salts in the dry milk.

The resulting nascent oxygen oxidizes all of the sulphydril compounds such as glutathione and cysteine which are reducing in character.

As above pointed out, the chlorinated milk powders of the present invention are not deleterious or damaging to the yeast fermentation in doughs using the chlorinated milk powders of the present invention as a constituent of the dough mix; nor are the proteins of the flours affected by the presence of the chlorinated milk powders of the present invention.

Instead of the chlorine gas, other chlorine-yielding compounds may be employed such as nitrosyl chloride, or a chlorine oxidizer, such as chlorine dioxide may be used.

Since commercial skim milk powders contain from six per cent to eight per cent by weight of soluble mineral salts, mostly basic salts capable of forming addition products with chlorine gas, and, in this case, these chlorine addition products, being very soluble in water, increase the water solubility of the chlorinated milk powders of the present invention. This is of great benefit in baking operations. These chlorine addition products also reduce the normal tendency of powdered milk to bind the dough and reduce oven-spring and volume, because these chlorine addition products do not impart as much viscosity to the dough as do the naturally occurring basic mineral salts.

This application is a continuation-in-part of my application Serial No. 625,939, filed October 31, 1945, now abandoned.

The preferred form of the invention having been thus described, what is claimed as new is:

1. A dry skim milk powder particularly adapted to improve the volume of oven-spring of baking dough, comprising a chlorinated dry skim milk powder containing less than 1% fat in which the chlorination has changed the reducing action of the —S—H radicals of the sulphydrils to a neutral —S—S radical in the structure.

2. A dry skim milk powder particularly adapted to improve the volume and oven-spring of yeast rising baking dough, comprising a dry skim milk powder having a small amount of a reactive chlorine acid therein and containing sulphydrils of a neutral —S—S radical as part of the structure and substantially free of sulphydril radical which have a reducing action on yeast rising baking dough.

3. A process of preparing dry skim milk powder containing sulphydrils having a reducing reaction comprising thoroughly contacting a dry skim milk powder containing about 3.5% moisture and less than 3% fat with two to six ounces of chlorine per one hundred pounds of milk powder for a period of three to six minutes to selectively oxidize the —S—H radicals of the sulphydrils to a neutral —S—S radical, thus destroying the reducing action of the milk powder on yeast baking dough.

4. The process defined in claim 3 in which the dry milk powder containing less than 1% fat is treated with four ounces of chlorine per one hundred pounds of powdered milk for a period of about five minutes.

FRANCIS FREDERICK HANSEN.

No references cited.